United States Patent
Igarashi

(10) Patent No.: US 8,390,857 B2
(45) Date of Patent: Mar. 5, 2013

(54) IMAGE FORMING APPARATUS, IMAGE FORMING METHOD, AND COMPUTER-READABLE RECORDING MEDIUM WHICH PERFORMS DUPLEX PRINTING AND INSERTS BLANK SHEET IMAGES

(75) Inventor: Masaaki Igarashi, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 660 days.

(21) Appl. No.: 12/577,363

(22) Filed: Oct. 12, 2009

(65) Prior Publication Data

US 2010/0110483 A1    May 6, 2010

(30) Foreign Application Priority Data

Oct. 31, 2008 (JP) .................................. 2008-281874

(51) Int. Cl.
*G06F 3/12* (2006.01)
(52) U.S. Cl. ........................ 358/1.15; 399/382
(58) Field of Classification Search ................. 358/1.15; 399/382
See application file for complete search history.

(56) References Cited

U.S. PATENT DOCUMENTS 7,474,424 B2 * 1/2009 Hokiyama ................. 358/1.15
2003/0056177 A1 * 3/2003 Nara et al. ................. 715/525

FOREIGN PATENT DOCUMENTS

JP       3419559       4/2003
JP       2003-173115   6/2003

* cited by examiner

*Primary Examiner* — Benny Tieu
*Assistant Examiner* — Qian Yang
(74) *Attorney, Agent, or Firm* — Oblon, Spivak, McClelland, Maier & Neustadt, L.L.P.

(57) ABSTRACT

An image forming apparatus prints print image data including both a duplex printing instruction and a simplex printing instruction while reducing or eliminating the development of a sheet interval. When it is determined that a print request includes both a duplex printing instruction and a simplex printing instruction, the maximum number N of transfer sheets that can be placed on a transport path is determined, and an order of output of print images is determined based on the maximum interleave number N. A blank sheet image is inserted in accordance with a switch timing from duplex printing to simplex printing.

5 Claims, 14 Drawing Sheets

FIG.4A
- A4/Long Edge Feed(LEF)
- Duplex from Page 1 to Page 6
- Simplex for Page 7
FIG.4B
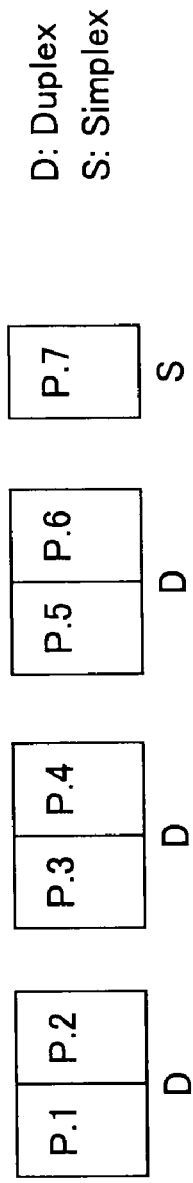
D: Duplex
S: Simplex
FIG.4C
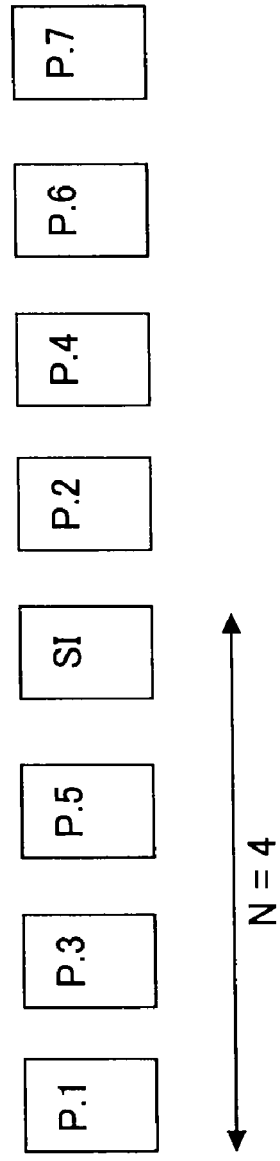

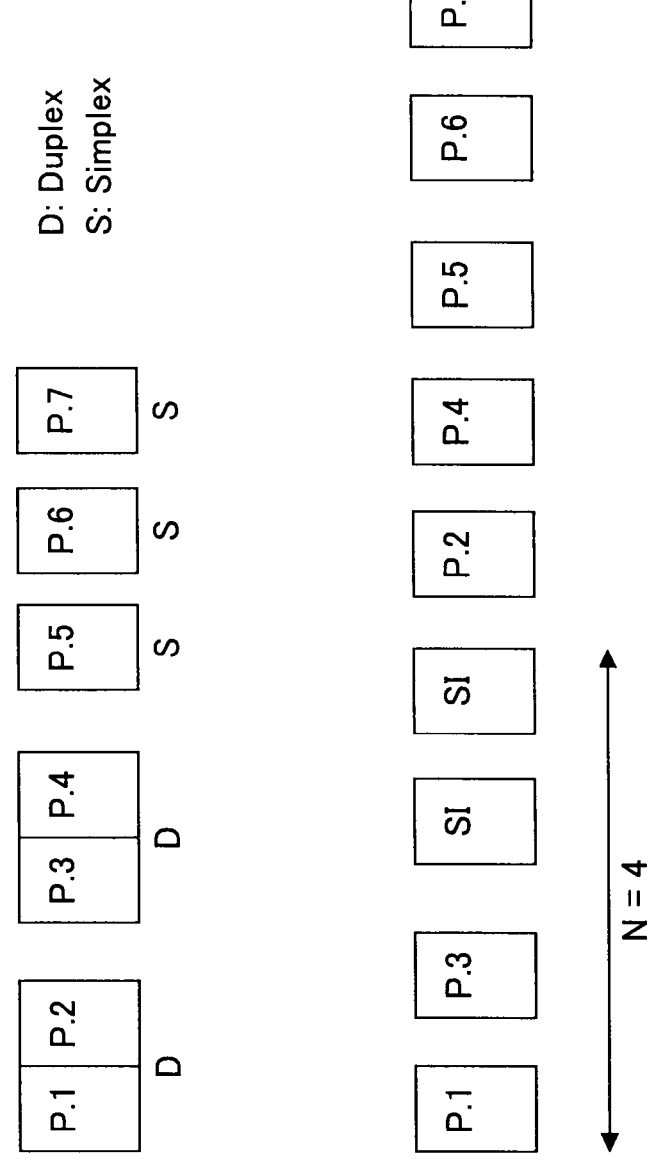

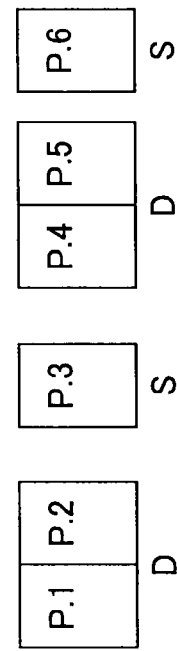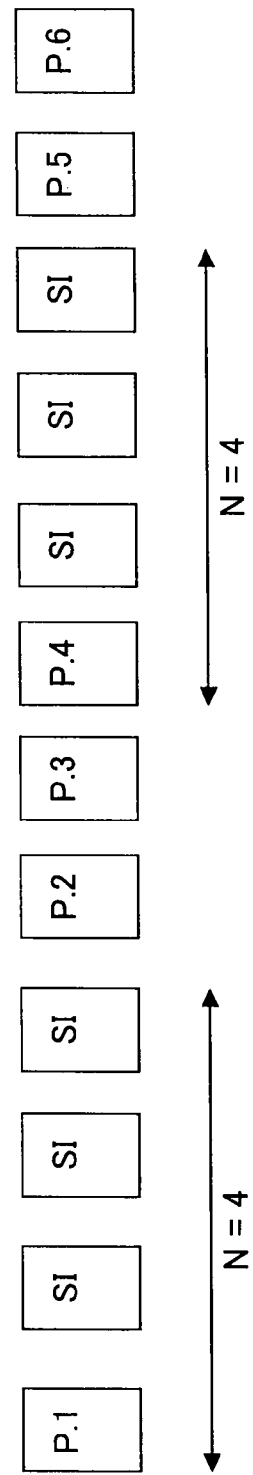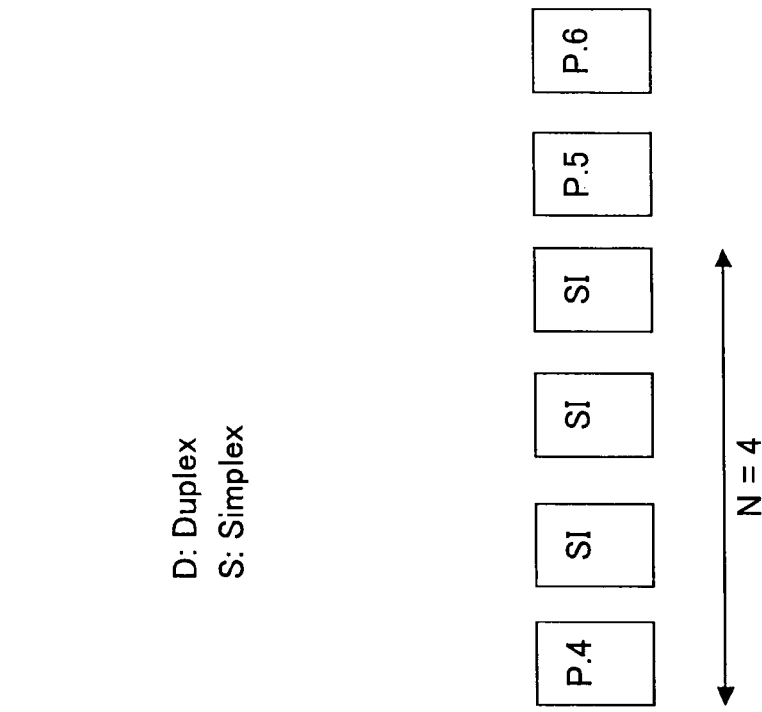
FIG.6A
- A4/Long Edge Feed(LEF)
- Duplex from Page 1 to Page 2, Page 4 to Page 5
- Simplex for Page 3 and 6
FIG.6B
FIG.6C

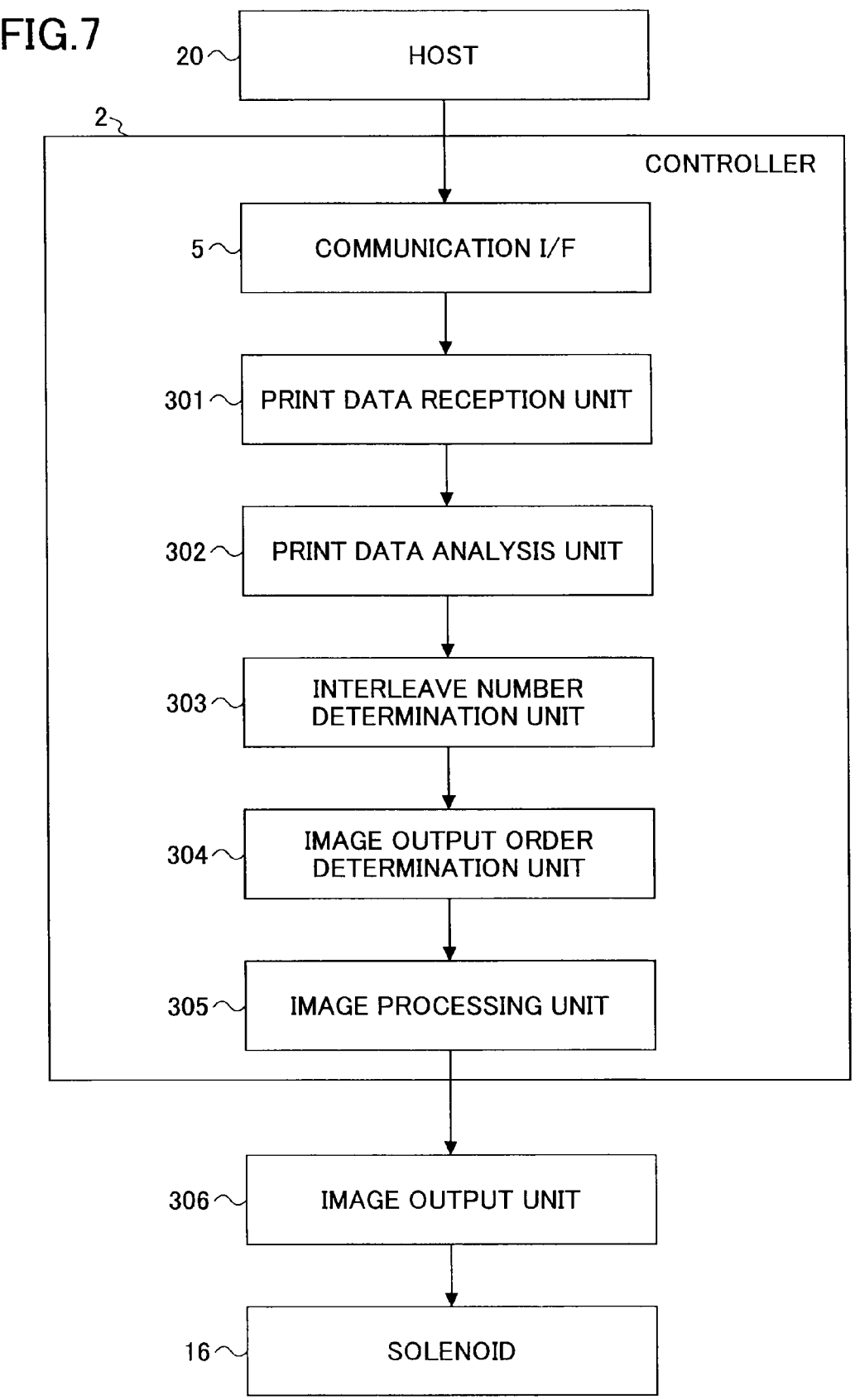

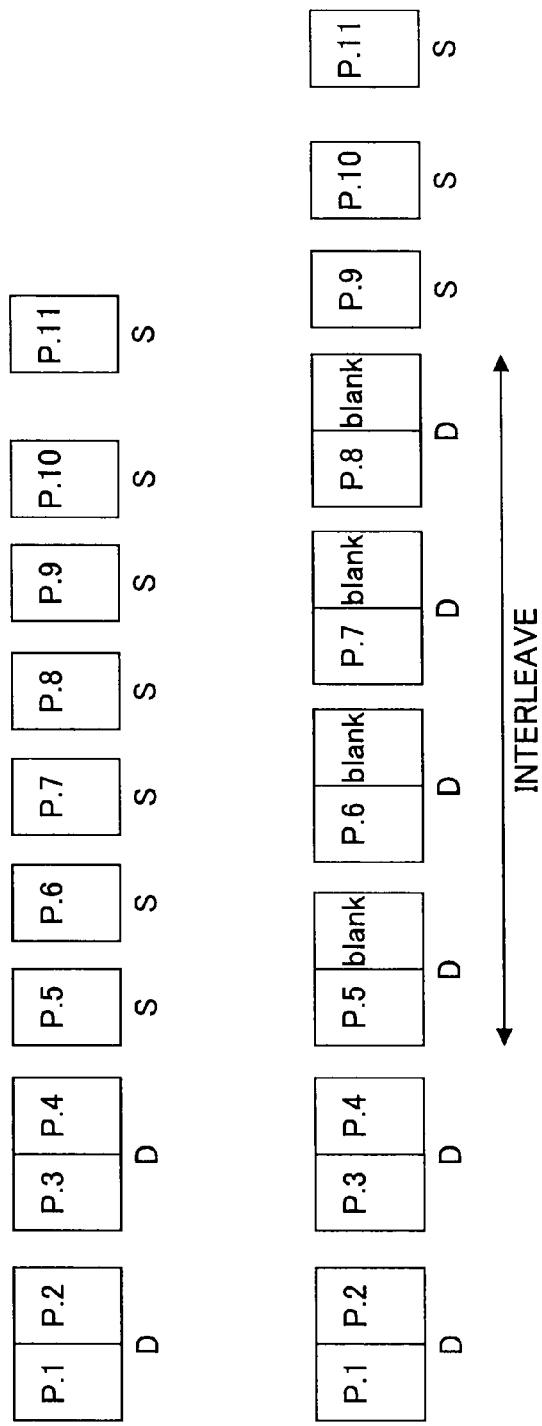

FIG.11B

| DUPLEX ENABLED SHEET TYPE | NORMAL PAPER | RECYCLED PAPER | COLOR PAPER 1 | ... |
|---|---|---|---|---|
| DUPLEX DISABLED SHEET TYPE | OHP | TRACING PAPER | INDEX PAPER | ... |

FIG.11C

| MAXIMUM INTERLEAVE NUMBER (N) | N = 4 | N = 2 |
|---|---|---|
| LENGTH OF SHEET [mm] | 148 ≤ L < 231 | 231 ≤ L ≤ 458 |
| STANDARD SIZE | ≤ LETTER(LEF) | ≥ LETTER(LEF) |

FIG.12A

JOB2
- A4/Long Edge Feed(LEF)
- Duplex from Page 1 to Page 8
- Simplex from Page 9 to Page 14

D: Duplex
S: Simplex

IMAGE FORMING APPARATUS, IMAGE FORMING METHOD, AND COMPUTER-READABLE RECORDING MEDIUM WHICH PERFORMS DUPLEX PRINTING AND INSERTS BLANK SHEET IMAGES

BACKGROUND OF THE INVENTION

1. Field of the Invention

The present invention generally relates to a method and apparatus for printing a large volume of print data including both an image for duplex printing and an image for simplex printing, without a decrease in print speed. The present invention also relates to a computer-readable recording medium in which a program for implementing the aforementioned method is recorded.

2. Description of the Related Art

Special applications are currently available that enable the generation of print data at the time of printing without the use of a printer driver. The "print data" herein includes an image to be printed and a print instruction that are transmitted to an image forming apparatus, such as a printer (The "image" herein refers to the image-rendered portion of PDL (Printer Description Language) data upon generation of the PDL data).

Such a special application may generate print data that includes both an image for which duplex printing (by which both sides of a transfer sheet are printed) is designated and another image for which simplex printing (by which only one side of a transfer sheet is printed) is designated. No such print data is generated by a printer driver. Conventionally, a dedicated printer has been employed for printing from such a special application; increasingly, however, normal office printers are employed due to improvements in their performance.

When duplex printing is performed by an image forming apparatus in order to save paper resources, for example, a transfer sheet is inverted along a duplex transport path. Accordingly, particularly in the case of a large-sized image forming apparatus with a long transport path, a time lag is produced between the completion of printing of an upper surface of the transfer sheet and the start of printing of a back surface of the transfer sheet when the upper surface and the back surface are printed alternately, resulting in a reduction in print speed and lowered productivity.

In order to solve this problem, the image forming apparatus may be provided with an interleave function. The interleave function improves the productivity of duplex printing by repeating the printing of upper surfaces of more than a certain number of transfer sheets, and then printing their back surfaces (see Japanese Laid-Open Patent Application No. 2003-173115, for example).

However, the interleave function may lead to lowered productivity in some cases of duplex printing. Specifically, when an original document is printed using the aforementioned special application that generates print data that includes both images for duplex printing and images for simplex printing, print speed sometimes significantly suffers compared to cases of duplex printing alone or simplex printing alone, particularly in the case of a high-speed image forming apparatus. One of the causes of this problem is the presence of a sheet interval. Upon switching from duplex printing to simplex printing in an image forming apparatus, the transfer sheet transport path is also switched from a duplex transport path to a simplex transport path. Depending on the number of transfer sheets that are being transported in the image forming apparatus, a sheet interval, which is a blank interval where no printing is performed, may be produced between the transfer sheets on the duplex transport path.

The sheet interval means an inactive period for a printer engine and thus a decrease in print speed when printing a large volume of print data including both duplex printing and simplex printing data.

SUMMARY OF THE INVENTION

According to one aspect of the present invention, an image forming apparatus includes an image forming unit including a transport path for transporting a transfer sheet and configured to form a print image on the transfer sheet based on print image data; an interleave unit configured to perform duplex printing by controlling an order of output of the print image data to the image forming unit; a receiving unit configured to receive a print request for the print image data; an analyzing unit configured to determine whether the print request received by the receiving unit includes a duplex printing instruction and a simplex printing instruction; a determination unit configured to determine a maximum number of the transfer sheets that can be placed on the transport path; an output order determination unit configured to determine the order of output of the print image data based on the maximum number of the transfer sheets determined by the determination unit; a switch timing determination unit configured to determine a switch timing for switching from duplex printing to simplex printing when the analyzing unit determines that the print request received by the receiving unit includes a duplex printing instruction and a simplex printing instruction; a blank sheet image inserting unit configured to insert a blank sheet image at the switch timing in the order of output of the print image data determined by the output order determination unit; an output unit configured to output the print image or the blank sheet image to the image forming unit in accordance with the output order determined by the output order determination unit; and a print switch control unit configured to control switching between duplex printing and simplex printing in accordance with the switch timing determined by the switch timing determination unit.

The blank sheet image is formed on a back surface of a transfer sheet for simplex printing while duplex printing is being performed.

According to another aspect of the present invention, there is provided an image forming method for printing print image data using an image forming apparatus having an interleave function for performing duplex printing by controlling an order of output of the print image data to an image forming unit of the image forming apparatus.

The image forming method includes determining whether the print image data includes both a duplex printing instruction and a simplex printing instruction; determining a maximum number of transfer sheets that can be placed on a transport path in the image forming apparatus; determining a switch timing between duplex printing and simplex printing when it is determined that the print image data includes both a duplex printing instruction and a simplex printing instruction; determining the order of output of the print image data to the image forming unit of the image forming apparatus, based on the determined maximum number of transfer sheets and the determined switch timing; outputting a print image or a blank sheet image to the image forming unit in the determined output order; and controlling the duplex printing and the simplex printing based on the determined switch timing.

According to yet another aspect of the present invention, a computer-readable recording medium stores an image formation control program for controlling printing of print image data using an image forming apparatus having an interleave function for performing duplex printing by controlling an order of output of the print image data to an image forming unit of the image forming apparatus.

The image formation control program, when executed by one or more processors of an information processing apparatus, carries out the steps of determining whether the print data includes both a duplex printing instruction and a simplex printing instruction; determining a maximum number of transfer sheets that can be placed on a transport path in the image forming apparatus; determining a switch timing between duplex printing and simplex printing when it is determined that the print image data includes both a duplex printing instruction and a simplex printing instruction; determining the order of output of the print data to the image forming unit of the image forming apparatus, based on the determined maximum number of transfer sheets and the determined switch timing; outputting a print image or a blank sheet image to the image forming unit in the determined output order; and controlling the duplex printing and the simplex printing based on the determined switch timing.

BRIEF DESCRIPTION OF THE DRAWINGS

Other objects, features and advantages of the present invention will become apparent upon consideration of the specification and the appendant drawings, in which:

FIGS. 4A through 4C illustrate an interleaving process involving a one-sheet interval;

FIGS. 5A through 5C illustrate an interleaving process involving a two-sheet interval;

FIGS. 6A through 6C illustrate an interleaving process involving a three-sheet interval.

FIG. 7 depicts a block diagram illustrating a functional structure of the image forming apparatus of FIG. 3;

FIGS. 8A through 8D illustrate different ways of determining an image output order under a certain set of conditions;

FIG. 11B depicts a table of various types of transfer sheet that either enable or do not enable duplex printing for a certain type of an image forming apparatus;

FIG. 11C depicts a table of different maximum interleave numbers N for various sizes of transfer sheet;

FIGS. 12A through 12D illustrate different ways of determining an image output order under another set of conditions.

DETAILED DESCRIPTION OF THE PREFERRED EMBODIMENTS

Printing System

Figure 1:
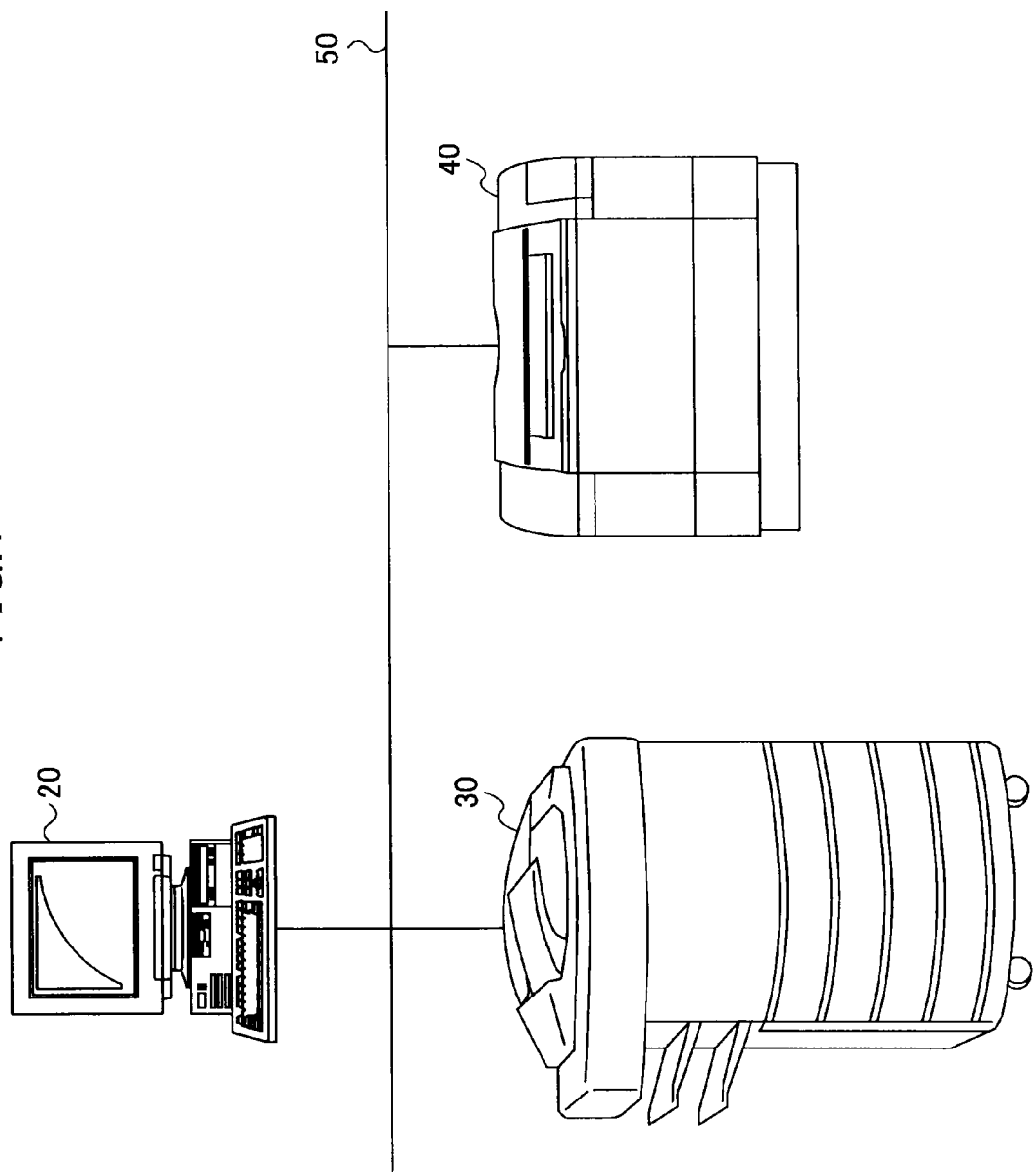
FIG. 1 depicts an image forming system according to an embodiment of the present invention.

Referring now to the drawings, wherein like reference numerals designate identical or corresponding parts throughout the several views, FIG. 1 depicts an image forming system including a PC (host apparatus) 20, a large-sized image forming apparatus 30, and a small-sized image forming apparatus 40, which are connected to a network 50. The image forming apparatus 30 or 40, or both, may be configured in accordance with an embodiment of the present invention. The image forming apparatus 30 or 40 may be based on an inkjet technology as well as an electrophotographic technology. The PC 20 transmits print data to the image forming apparatus 30 or 40 directly without going through a printer driver. Instead of via the network 50, the PC 20 may be connected to the image forming apparatus 30 or 40 via a communication interface (I/F) 5 (see FIG. 3) based on USB, IEEE 1394, Centronics, wireless, or infrared technologies, for example.

Figure 2:
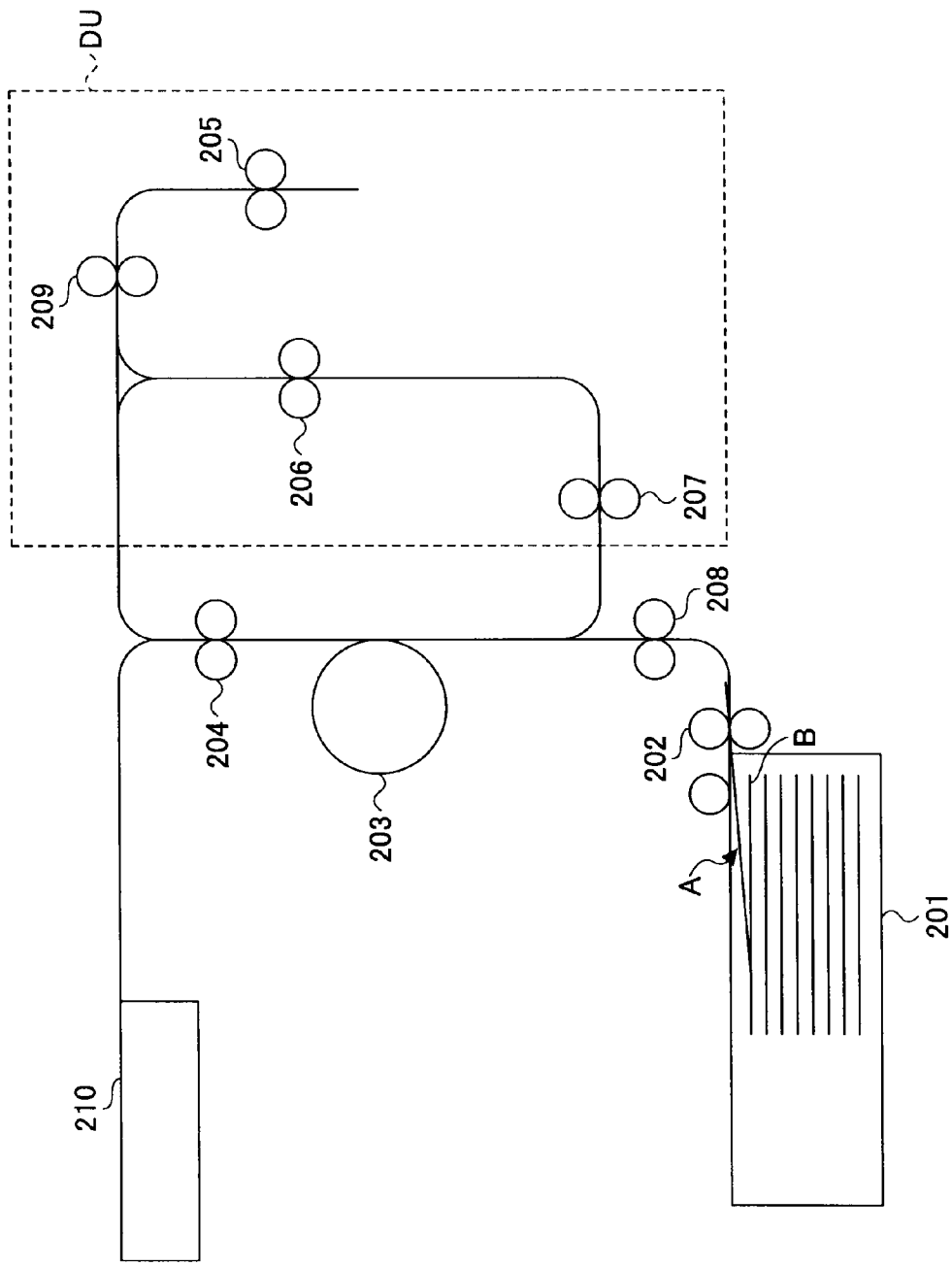
FIG. 2 is a diagram of an image forming apparatus in the system depicted in FIG. 1.

FIG. 2 depicts a diagram of the image forming apparatus 30 or 40. A simplex printing process is performed in the image forming apparatus 30 or 40 as follows. A transfer sheet is fed from a paper-feed tray 201 by paper-feed rollers 202. After an image transfer process, the transfer sheet is transported to a fusing unit 203 where a transferred image is fused on the transfer sheet. The transfer sheet with the fused image is then directed by a transport path switching unit 204 to an ejection tray 210.

Interleaving

A two-sheet interleaving duplex printing process involving two transfer sheets in the image forming apparatus is described with reference to FIG. 2. A first transfer sheet A is fed from the paper-feed tray 201 by the paper-feed rollers 202. After an image is transferred to an upper surface of the transfer sheet A, the transfer sheet A is transported to the fusing unit 203 where the upper surface image is fused onto the transfer sheet A. The transfer sheet A with the fused upper surface image is then directed by the transport path switching unit 204 to a duplexing unit DU. In the duplexing unit DU, the transfer sheet A is inverted by an inverter unit 205. The inverted transfer sheet A is directed to a duplex paper-feed unit 206 by a transport path switching unit 209.

While the transfer sheet A is being transported in the duplexing unit DU, a second transfer sheet B is fed from the paper-feed tray 201 using the paper-feed rollers 202. The transfer sheet B is transported to the fusing unit 203 where, after an image transfer process, an upper surface image is fused on an upper surface of the transfer sheet B. At this time, the transfer sheet A in the duplex paper-feed unit 206 waits for the formation of the upper surface image on the transfer sheet B.

The transfer sheet B with the fused upper surface image is directed by the transport path switching unit 204 to the duplexing unit DU, while the transfer sheet A is transported by the duplex paper-feed rollers 207 to the fusing unit 203 where, following an image transfer process, a transferred back surface image is fused on the transfer sheet A. Meanwhile, the transfer sheet B that has been transported to the duplexing unit DU is inverted by the inverter unit 205. The inverted transfer sheet B is directed by the transport path switching unit 209 to the duplex paper-feed unit 206.

Once the formation of the back surface image on the transfer sheet A is completed, the transfer sheet A is directed by the transport path switching unit 204 to the ejection tray 210. The transfer sheet B is transported by the duplex paper-feed rollers 207 to the fusing unit 203 where a transferred back surface image is fused on the transfer sheet B. Then, the transfer sheet B is directed by the transport path switching unit 204 to the ejection tray 210. Thus, in the two-sheet interleaving duplex printing method, printing of an upper surface of a second transfer sheet is completed before printing the back surface of the first transfer sheet, thereby reducing a blank time in the image formation process and improving the productivity of duplex printing.

The so-called interleaving duplex printing involves inverting a transfer sheet in a duplex transport path, and executing a back surface printing after a certain number of transfer sheets are printed on their upper surfaces. More specifically, instead of realizing a duplex printing process by printing upper surfaces and back surfaces alternately, upper surfaces are successively printed and then corresponding back surfaces are printed. This duplex printing method enables a faster print operation than a method involving the storage of transfer sheets in an intermediate tray, for example, and provides higher productivity.

According to the above-described two-sheet interleaving duplex printing method, up to two sheets can be placed on the transport path during the duplex printing. The maximum number of transfer sheets that can be placed on the transport path during duplex printing is referred to as the maximum interleave number N. The maximum interleave number N is not limited to two. The maximum interleave number N may be 3 in a three-sheet interleaving process, wherein an upper surface of a third transfer sheet is printed before the back surface of the first transfer sheet is printed. The maximum interleave number N may be four or more. The basic concept, however, is the same regardless of the maximum interleave number N. The maximum interleave number N may vary depending on the size of the image forming apparatus. For example, the small-sized image forming apparatus 40 has a shorter transport path than that of the large-sized image forming apparatus 30, so that the maximum interleave number N of the small-sized image forming apparatus 40 may be smaller than that of the large-sized image forming apparatus 30.

In the following description of an embodiment, the maximum interleave number N is four.

Printer

Figure 3:
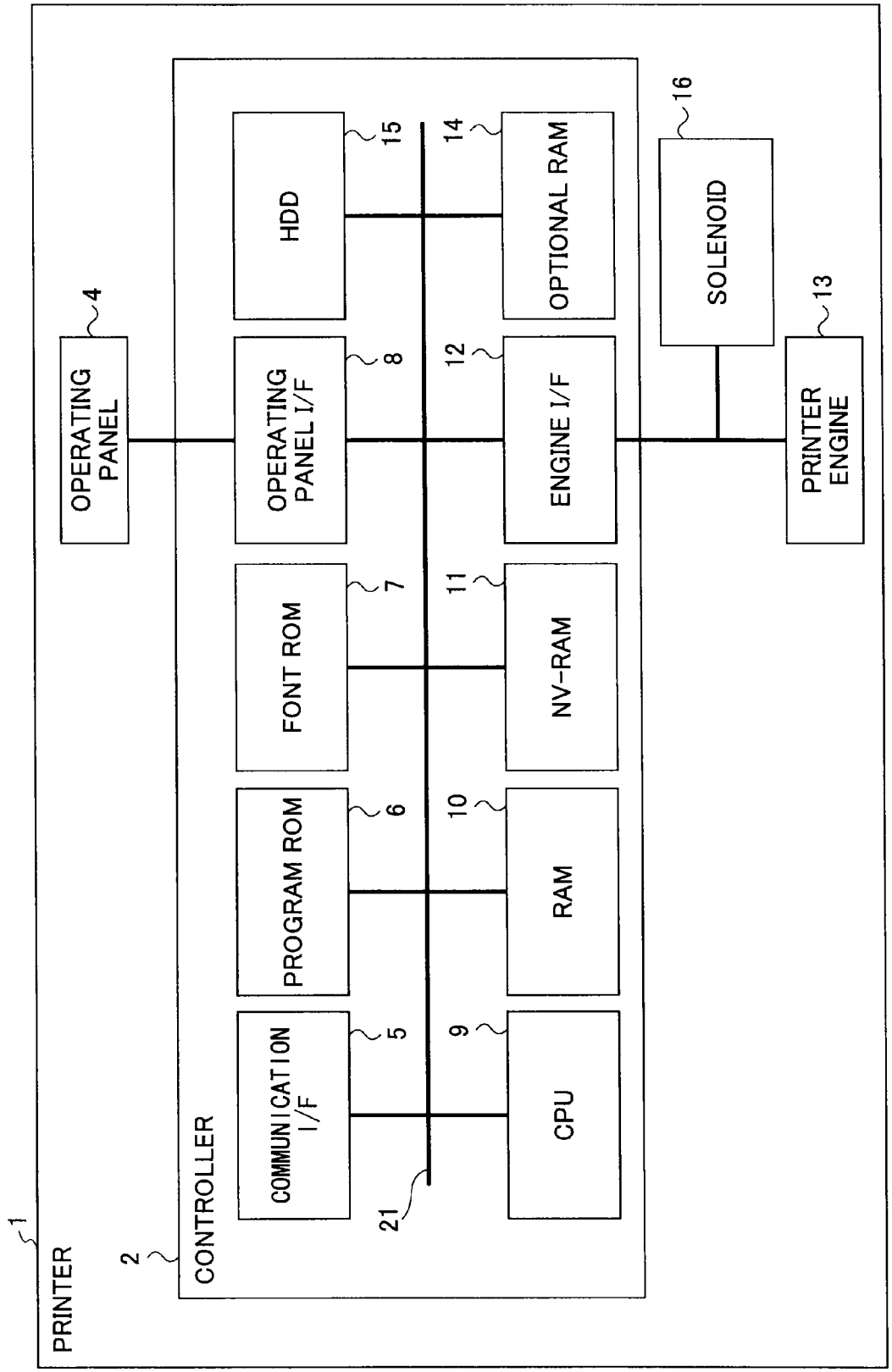
FIG. 3 depicts a block diagram illustrating a hardware structure of an image forming apparatus according to an embodiment of the present invention.

FIG. 3 depicts a block diagram of a printer 1 according to an embodiment of the present invention. The printer 1 includes a controller 2, an operating panel 4, and a printer engine 13. The printer 1 may include a color printer or a color multifunction peripheral.

The printer engine (image forming unit) 13 includes a transfer sheet transport path (not shown) for transporting a transfer sheet fed from a paper-feed cassette in a paper-feed unit. Along the transfer sheet transport path, transport rollers, resist rollers, transfer rollers, and guide plates are disposed (not shown). The fusing unit 203 shown in FIG. 2 is disposed downstream of the transfer sheet transport path. The fusing unit 203 is configured to heat and press a transfer sheet having a transferred toner image in order to fuse the toner image onto the transfer sheet. The transfer sheet is then transported to ejection rollers disposed further downstream by which the transfer sheet is sent to an ejection unit.

The printer engine 13 includes an optical writing unit that may include a polygon motor, a polygon mirror, an Fθ lens, a laser diode as a light source, and mirrors. The laser diode emits a write beam of light modulated in accordance with image data. A photosensitive body is irradiated with the write beam of light from the optical writing unit to form an electrostatic latent image. As the photosensitive body passes a developing/toner storage unit (not shown) disposed along the transport path, toner is attached to the electrostatic latent image on the photosensitive body, thus producing a visible toner image. As the photosensitive body further moves or rotates, for example, and the toner image is opposite the transfer rollers, the toner image is transferred by the transfer rollers onto a transfer sheet that is transported between the transfer rollers and the photosensitive body. The transfer sheet with the transferred toner image is transported to the fusing unit 203.

The fusing unit 203 heats and presses the transfer sheet using fusing rollers heated to a fusing temperature and pressing rollers, thereby fusing the toner image on the transfer sheet. The thus fused transfer sheet is ejected onto the ejection unit by transport rollers. The photosensitive body, after the transfer process, is further moved for another cycle of image formation after the residual toner on the photosensitive body is removed by a cleaning/waste toner collecting unit (not shown).

The operating panel 4 includes various operating keys necessary for operating the printer 1, such as a start key, a stop key, a numerical keypad, and an image quality setting key. The operating panel 4 may also include a display, such as an LCD display, for displaying various information items, such as an instruction entered via one of the operating keys or a message from the printer 1 to a user.

The controller 2 includes a control mechanism for converting print data from the host apparatus 20 into image data in a certain control mode and a control code designated by the host apparatus 20, and for sending the image data to the printer engine 13. The controller 2 includes a communication I/F 5, a program read only memory (ROM) 6, a font ROM 7, an operating panel I/F 8, a hard disk drive (HDD) 15, a central processing unit (CPU) 9, a random access memory (RAM) 10, a non-volatile RAM 11, an engine I/F 12, and an optional RAM 14. These units are connected via a bus 21.

The host apparatus 20 is connected to the communication I/F 5. The communication I/F 5 receives print data from the host apparatus 20, or transmits data or a signal, such as a status signal, from the printer 1 to the host apparatus 20. The program ROM 6 stores various programs, such as a program for managing data or processes in the controller 2 or controlling a peripheral module. Specifically, the programs may include a basic process program for the printer 1, an image formation control program for implementing an image formation control method as will be described later, and various data necessary for implementing such programs. The font ROM 7 stores various font data used for printing by the printer 1. The font data may be read by the CPU 9 during a print process.

The image formation control program for implementing the image formation control method according to an embodiment may be recorded in a computer-readable recording medium. Examples of such a computer-readable recording medium, which may be distributed, include a ROM, an EEPROM (Electrically Erasable and Programmable Read Only Memory), an EPROM, a flash memory, a flexible disk, a CD-ROM (Compact Disc ROM), a CD-RW (Compact Disc Rewritable), a DVD (Digital Video Disk), an SD (Secure Digital) card, and an MO (Magneto-Optical) disc. The image formation control program in the computer-readable recording medium may be read by the printer 1, loaded into the program ROM 6 or the like, and then executed to implement an image formation control method. The image formation control program may be written in a legacy programming language such as assembly language, C, or C++, or an object-oriented programming language such as C# or Java™.

The operating panel 4 is connected to the operating panel I/F 8 via which signals are exchanged between the individual units of the controller 2 and the operating panel 4. The HDD 15 is a large-volume data storage unit in which print data may be stored. The CPU 9 may perform a print process (image formation process) and an image formation control process, which will be described later, by controlling the various units of the printer 1 in accordance with the program stored in the program ROM 6, using the RAM 10 as a work memory.

The RAM 10, in addition to providing a work memory for the CPU 9, may provide a buffer for temporarily storing and managing print data from the host apparatus 20 on a page by page basis. The RAM 10 may also provide a bit map memory for producing actual rendering data (video data) from the print data. The NV-RAM 11 stores data that needs to be retained when power supply to the printer 1 is turned off, under the control of the CPU 9. The optional RAM 14 is a detachable auxiliary memory which may be used when the capacity of the RAM 10 is lacking.

The printer engine 13 is connected to the engine I/F 12 via which a control signal or a video signal may be sent from the controller 2 to the printer engine 13, or a status signal may be sent from the printer engine 13 to the controller 2. The printer engine 13 performs image formation (print process) by electrophotography in accordance with the video signal (image signal) and a control signal received from the controller 2 via the engine I/F 12.

A solenoid 16 is configured to drive a separating gate (not shown) for switching between a transport path used for simplex printing and an inverting transport path used for duplex printing.

Examples of Sheet Interval

In an interleaving process, for normal printing from a PC via a printer driver, the interleave function is automatically applied in an image forming apparatus to enhance productivity. However, as described above, when printing from a special application that produces print data containing both duplex printing and simplex printing data, an engine pause time (sheet interval) is produced when switching from duplex printing to simplex printing, resulting in an unintended decrease in productivity.

FIG. 4A illustrates an example of a print setting designated by the PC 20. The line "A4/Long-Edge-Feed (LEF)" designates an A4-sized, long-edge-feed transfer sheet. The next line "Duplex from Page 1 to Page 6" designates duplex printing for pages 1 through 6. The line "Simplex for Page 7" designates simplex printing for page 7.

FIG. 4B illustrates an intended printed result obtained from the print designation of FIG. 4A. As illustrated in FIG. 4B, page 1 is printed on an upper surface of the first sheet, and page 2 is printed on a back surface of the first sheet. Page 3 is printed on an upper surface of the second sheet, and page 4 is printed on a back surface of the second sheet. Page 5 is printed on an upper surface of the third sheet, and page 6 is printed on a back surface of the third sheet. Page 7 is printed on an upper surface of the fourth sheet.

FIG. 4C illustrates an interleaving process in accordance with the print designation of FIG. 4A. As mentioned above with reference to FIG. 2, in order to improve productivity of a duplex printing process, after an image for the upper surface of a transfer sheet is fused by the fusing unit 203, an upper surface of the next transfer sheet is printed before the back surface of the first transfer sheet is printed. Namely, the second and any subsequent transfer sheets are placed on the transport path within the maximum interleave number N, which is 4 in the present embodiment.

First, a first transfer sheet is fed from the paper-feed tray 201 by the paper-feed rollers 202. After the image for page 1 is fused on the upper surface of the first sheet by the fusing unit 203, the first transfer sheet is directed by the transport path switching unit 204 to the duplexing unit DU. Then, a second transfer sheet is fed from the paper-feed tray 201 and the image for page 3 is fused on the upper surface of the second sheet by the fusing unit 203. The second transfer sheet is then directed by the transport path switching unit 204 to the duplexing unit DU. A third transfer sheet is then fed from the paper-feed tray 201 and the image for page 5 is fused on the upper surface of the third sheet by the fusing unit 203. The third transfer sheet is then directed by the transport path switching unit 204 to the duplexing unit DU.

Thereafter, if a fourth transfer sheet for page 7, for which simplex printing is designated, is placed on the transport path, the image for page 7 would be formed on the upper surface of the fourth transfer sheet and the fourth transfer sheet would be ejected even before the pages 2, 4, and 6 are printed on the back surfaces of the first through third transfer sheets; Namely, simplex printing would be completed before completion of duplex printing. Because this would change the intended print order, the transfer sheet for page 7 stands by at a transfer sheet stand-by unit 208 instead of being placed on the transport path. As a result, a single-sheet interval (SI) where no image formation is performed is inserted between page 5, which is formed on the upper surface of the third sheet for duplex printing, and page 2, which is formed on the back surface of the first sheet for duplex printing, as depicted in FIG. 4C.

The first transfer sheet transported to the duplexing unit DU is inverted via the inverter unit 205 and then directed by the transport path switching unit 209 to the duplex paper-feed unit 206. The first transfer sheet is then transported by the duplex paper-feed rollers 207 to the fusing unit 203, where the image of page 2 is fused on the back surface of the first sheet. Then the first sheet is directed by the transport path switching unit 204 to the ejection tray 210. The images for pages 4 and 6 are then fused on the back surfaces of the second and the third sheets, respectively, and the fourth transfer sheet is fed from the paper-feed tray 201. After the image of page 7 is fused on the fourth transfer sheet by the fusing unit 203, the fourth transfer sheet with page 7 printed on it is directed by the transport path switching unit 204 to the ejection tray 210.

FIG. 5A illustrates another example of print settings designated by the PC 20. The first line "A4/Long-Edge-Feed (LEF)" designates an A4-sized, Long-Edge-Feed transfer sheet. The second line "Duplex from Page 1 to Page 4" designates duplex printing for pages 1 through 4. The third line "Simplex from Page 5 to Page 7" designates simplex printing for pages 5 through 7.

FIG. 5B illustrates a result of printing in accordance with the print designation of FIG. 5A. Page 1 is printed on the upper surface of the first sheet; page 2 is printed on the back surface of the first sheet; page 3 is printed on the upper surface of the second sheet; page 4 is printed on the back surface of the second sheet; page 5 is printed on the upper surface of the third sheet; page 6 is printed on the upper surface of the fourth sheet; and page 7 is printed on the upper surface of the fifth sheet.

FIG. 5C illustrates an interleaving process in accordance with the print designation of FIG. 5B. After the first transfer sheet is fed from the paper-feed tray 201 by the paper-feed rollers 202, the image for page 1 is fused on the upper surface of the first sheet by the fusing unit 203. The first transfer sheet is then directed by the transport path switching unit 204 to the duplexing unit DU. Then, a second transfer sheet is fed from the paper-feed tray 201, and the image for page 3 is fused on the upper surface of the second sheet by the fusing unit 203. The second transfer sheet is then directed by the transport path switching unit 204 to the duplexing unit DU.

If a third transfer sheet for page 5, for which simplex printing is designated, is now placed on the transport path, the image for page 5 would be formed and the third transfer sheet with page 5 formed on it would be ejected before the pages 2 and 4 are formed on the back surfaces of the first and second transfer sheets for duplex printing. Namely, simplex printing would be completed before the completion of duplex printing, changing the intended print order. Thus, the third sheet for page 5 stands by at the transfer sheet stand-by unit 208. As a result, a two-sheet interval (SI) is inserted between page 3, which is printed on the upper surface of the second sheet, and page 2, which is to be printed on the back surface of the first sheet, the two-sheet interval being where no image formation is performed, as illustrated in FIG. 5C.

The first transfer sheet transported to the duplexing unit DU is inverted by the inverter unit 205 and then directed by the transport path switching unit 209 to the duplex paper-feed unit 206. The first transfer sheet is then transported by the duplex paper-feed rollers 207 to the fusing unit 203, where the image for page 2 is fused on the back surface of the first sheet. The first sheet with page 2 printed on it is directed by the transport path switching unit 204 to the ejection tray 210. While the image for page 4 is formed on the back surface of the second sheet, a third transfer sheet is fed from the paper-feed tray 201, and the third transfer sheet stands by at the transfer sheet stand-by unit 208. After image formation for page 4 is completed by the fusing unit 203, the second transfer sheet is directed by the transport path switching unit 204 to the ejection tray 210. Because the following pages 5, 6, and 7 are designated for normal simplex printing, those pages are not transported to the duplexing unit DU but are directed by the transport path switching unit 204 to the ejection tray 210 after the corresponding images are successively fused on the transfer sheets by the fusing unit 203.

FIG. 6A illustrates another example of print settings designated by the PC 20. The first line "A4/Long-Edge-Feed (LEF)" designates an A4-sized Long-Edge-Feed transfer sheet. The second line "Duplex from Page 1 to Page 2, Page 4 to Page 5" designates duplex printing for pages 1 and 2, and 4 and 5. The third line "Simplex for Page 3 and 6" designates simplex printing for pages 3 and 6.

FIG. 6B illustrates a result of printing in accordance with the print designation of FIG. 6A. As illustrated in FIG. 6B, page 1 is printed on the upper surface of the first sheet; page 2 is printed on the back surface of the first sheet; page 3 is printed on the upper surface of the second sheet; page 4 is printed on the upper surface of the third sheet; page 5 is printed on the back surface of the third sheet; and page 6 is printed on the upper surface of the fourth sheet.

FIG. 6C illustrates an interleaving process in accordance with the print designation of FIG. 6A. The first transfer sheet is fed from the paper-feed tray 201 by the paper-feed rollers 202. After the image for page 1 is fused on the upper surface of the first sheet by the fusing unit 203, the first transfer sheet is directed by the transport path switching unit 204 to the duplexing unit DU.

If a second transfer sheet for page 3 for which simplex printing is designated is now placed on the transport path, the image for page 3 would be formed and the transfer sheet with page 3 printed on it would be ejected before the formation of page 2 on the back surface of the first transfer sheet for duplex printing. Namely, simplex printing would be completed before completion of duplex printing, thereby changing the intended print order. Thus, the transfer sheet for page 3 stands by at the transfer sheet stand-by unit 208 instead of being placed on the transport path. As a result, as shown in FIG. 6C, a three-sheet interval (SI) is produced between page 1 printed on the upper surface of the first sheet, and page 2 to be printed on the back surface of the first sheet, the three-sheet interval being where no image formation is performed.

The first transfer sheet transported to the duplexing unit DU is inverted by the inverter unit 205 and is then directed by the transport path switching unit 209 to the duplex paper-feed unit 206. The first transfer sheet is then transported by the duplex paper-feed rollers 207 to the fusing unit 203. While image formation for page 2 is being carried out on the back surface of the first sheet, a second transfer sheet is fed from the paper-feed tray 201 and it stands by at the transfer sheet stand-by unit 208. After completion of image formation for page 2 by the fusing unit 203, the first sheet is directed by the transport path switching unit 204 to the ejection tray 210. While image formation for page 3 is being performed on the upper surface of the second sheet by the fusing unit 203, the third transfer sheet is fed from the paper-feed tray 201 and it stands by at the transfer sheet stand-by unit 208. Because page 3 is designated for simplex printing, the second sheet is directed by the transport path switching unit 204 to the ejection tray 210 after completion of image formation by the fusing unit 203.

After the image for page 4 is formed on the upper surface of the third transfer sheet by the fusing unit 203, the third transfer sheet is directed by the transport path switching unit 204 to the duplexing unit DU. The third transfer sheet transported to the duplexing unit DU is then inverted by the inverter unit 205 and further directed by the transport path switching unit 209 to the duplex paper-feed unit 206. The third transfer sheet is further transported by the duplex paper-feed rollers 207 to the fusing unit 203. Between the formation of page 4 on the upper surface of the third transfer sheet and the arrival of the third transfer sheet at the fusing unit 203, another three-sheet interval is produced where no image formation is performed.

Finally, while image formation for page 5 is being performed by the fusing unit 203 on the back surface of the third transfer sheet, a fourth transfer sheet is fed from the paper-feed tray 201 and it stands by at the transfer sheet stand-by unit 208. After image formation for page 5 is completed by the fusing unit 203, the third transfer sheet is directed by the transport path switching unit 204 to the ejection tray 210. Because page 6, which is to be printed on the upper surface of the fourth transfer sheet, is designated for simplex printing, the fourth transfer sheet is directed by the transport path switching unit 204 to the ejection tray 210 after completion of image formation by the fusing unit 203.

Thus, in order to eject the transfer sheets in the print order designated by the host apparatus 20, the transport path for duplex printing cannot be filled with transfer sheets if the number of the transfer sheets for duplex printing is less than 4 or 8 pages upon switching from duplex printing to simplex printing, resulting in a sheet interval and a decrease in productivity. Particularly, if the print data including less than four sheets or 8 pages of images designated for duplex printing occurs a number of times among simplex printing, the potential print speed of the image forming apparatus cannot be exploited, and a significant decrease in productivity results.

Compulsory Duplexing

FIG. 7 is a block diagram illustrating a functional structure of an image forming apparatus according to an embodiment of the present invention. The image forming apparatus includes a communication I/F 5, a print data reception unit 301, a print data analyzing unit 302, an interleave number determination unit 303, an image output order determination unit 304, an image processing unit 305, an image output unit 306, and a solenoid 16.

The communication I/F 5, which may be connected to the network 50 shown in FIG. 1, controls a communication process with the host apparatus (PC) 20 or an external unit, such as a server or another image forming apparatus, via the network 50. The print data reception unit 301 performs a process of receiving print data transmitted by the PC 20 or the like via the network 50.

The print data analyzing unit 302 performs a process of analyzing the print data received by the print data reception unit 301. The analysis of print data includes 1) a determination as to whether both duplex printing and simplex printing data exist in single print job data, requiring switching between duplex printing and simplex printing; and 2) a determination as to whether each image in the print data is designated for duplex printing or simplex printing, and confirmation of a print direction of each image. The interleave number determination unit 303 determines whether a duplex-print-enabling setting (such as whether the sheet type, the sheet size, and the paper-feed tray 201 are enabled for duplex printing) is made by the application, and also determines the maximum interleave number N.

When the data analyzing unit 302 determines that the single print job data includes both duplex printing and simplex printing data, requiring switching between duplex printing and simplex printing, the image output order determination unit 304 determines a switch timing between duplex printing and simplex printing, and determines an image output order based on the switch timing and the maximum interleave number N determined by the interleave number determination unit 303. The images for which the output order is determined may include a blank page for preventing the development of a sheet interval, as will be described later.

The image processing unit 305 performs a process of rasterizing an image, including a blank page. The image output unit 306 performs a process of outputting the image or blank page rasterized by the image processing unit 305 to the printer engine 13 in the output order determined by the image output order determination unit 304. The solenoid 16 drives the separating gate in accordance with the switch timing determined by the image output order determination unit 304 in order to switch between the transport path for simplex printing and the inverting transport path for duplex printing.

FIGS. 8A through 8D illustrate a process of determining an image output order in the image forming apparatus according to an embodiment. FIG. 8A shows print conditions for JOB 1, designating an A4-sized, Long-Edge-Feed transfer sheet, and duplex printing for pages 1 through 4 and simplex printing for pages 5 through 11. The image forming apparatus has the maximum interleave number of four.

FIG. 8B illustrates an intended result of printing JOB 1. As shown, page 1 is printed on the upper surface of the first transfer sheet; page 2 is printed on the back surface of the first transfer sheet; page 3 is printed on the upper surface of the second transfer sheet; page 4 is printed on the back surface of the second transfer sheet; page 5 is printed on the upper surface of the third transfer sheet; page 6 is printed on the upper surface of the fourth transfer sheet; page 7 is printed on the upper surface of the fifth transfer sheet; page 8 is printed on the upper surface of the sixth transfer sheet; page 9 is printed on the upper surface of the seventh transfer sheet; page 10 is printed on the upper surface of the eighth transfer sheet; and page 11 is printed on the upper surface of the ninth transfer sheet.

Duplex/Simplex Switch Count Method

FIG. 8C illustrates a duplex/simplex switch count method. Because switching from duplex printing to simplex printing occurs at page 5, the interleave number is counted from page 5. Because the maximum interleave number N is four, blank pages are inserted so that four transfer sheets for simplex printing can be handled as transfer sheets for duplex printing and can therefore be ejected via the duplex transport path. Thus, JOB 1 is substantially processed as consisting of six sheets of successive duplex printing and three sheets of simplex printing.

Duplex Designation Count Method

FIG. 8D illustrates a duplex designation count method. In this method, instead of starting the counting of the interleave number at the switch timing, the counting of the interleave number starts upon starting of duplex printing. As shown in FIG. 8D, because duplex printing starts from page 1, the interleave number is counted from page 1, so that it is only necessary to insert blank pages for the back surfaces of pages 5 and 6 that are designated for simplex printing. Thus, the number of transfer sheets that are passed through the duplex transport path can be reduced, whereby duplex printing can be switched to simplex printing from page 7, as shown in FIG. 8D, thereby improving productivity.

Output Order by Duplex/Simplex Switch Count Method

Figure 9A:
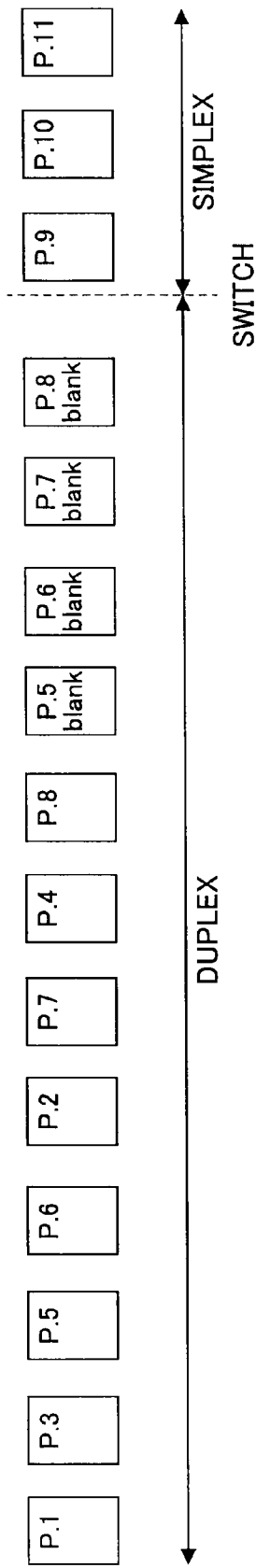
FIGS. 9A and 9B illustrate image output results obtained by the different ways of determining an image output order shown in FIGS. 8C and 8D.

FIG. 9A illustrates an output order for JOB 1 determined by the duplex/simplex switch count method. As shown, a switch timing between duplex printing and simplex printing is determined between the sixth transfer sheet and the seventh transfer sheet. Based on the switch timing and the maximum interleave number N which is four, the first output image is assigned to page 1; the second output image is assigned to page 3; the third output image is assigned to page 5; the fourth output image is assigned to page 6; the fifth output image is assigned to page 2; the sixth output image is assigned to page 7; the seventh output image is assigned to page 4; the eighth output image is assigned to page 8; the ninth, the tenth, the eleventh, and the twelfth output images are assigned to blank pages; the thirteenth output image is assigned to page 9; the fourteenth output image is assigned to page 10; and the fifteenth output image is assigned to page 11.

The first transfer sheet is fed from the paper-feed tray 201 by the paper-feed rollers 202, and the image for page 1 is fused on the upper surface of the first transfer sheet by the fusing unit 203. Then, the first transfer sheet is directed by the transport path switching unit 204 to the duplexing unit DU. The first transfer sheet transported to the duplexing unit DU is inverted by the inverter unit 205 and then directed by the transport path switching unit 209 to the duplex paper-feed unit 206.

Thereafter, the second transfer sheet is fed from the paper-feed tray 201, and the image for page 3 is formed on the upper surface of the second transfer sheet by the fusing unit 203. The second transfer sheet is directed by the transport path switching unit 204 to the duplexing unit DU. The second transfer sheet transported to the duplexing unit DU is then inverted by the inverter unit 205 and directed by the transport path switching unit 209 to the duplex paper-feed unit 206.

The third transfer sheet is then fed from the paper-feed tray 201, and the image for page 5 is formed on the upper surface of the third transfer sheet by the fusing unit 203. The third transfer sheet is directed by the transport path switching unit 204 to the duplexing unit DU. The third transfer sheet is inverted by the inverter unit 205 and then directed by the transport path switching unit 209 to the duplex paper-feed unit 206.

The fourth transfer sheet is then fed from the paper-feed tray 201 and the image for page 6 is formed on the upper surface of the fourth transfer sheet by the fusing unit 203. The fourth transfer sheet is directed by the transport path switching unit 204 to the duplexing unit DU. The fourth transfer sheet is further inverted by the inverter unit 205 and then directed by the transport path switching unit 209 to the duplex paper-feed unit 206.

Still referring to FIG. 9A, the first transfer sheet is then fed from the duplex paper-feed rollers 207 to the fusing unit 203, where the image for page 2 is fused on the back surface of the first transfer sheet. Then, the first transfer sheet is directed by the transport path switching unit 204 to the ejection tray 210.

Then the fifth transfer sheet is fed from the paper-feed tray 201, and the image for page 7 is fused on the upper surface of the fifth transfer sheet by the fusing unit 203. The fifth transfer sheet is directed by the transport path switching unit 204 to the duplexing unit DU. The fifth transfer sheet is inverted by the inverter unit 205 and further directed by the transport path switching unit 209 to the duplex paper-feed unit 206.

The second transfer sheet is then transported by the duplex paper-feed rollers 207 to the fusing unit 203, where the image for page 4 is fused on the back surface of the second transfer sheet, which is then directed by the transport path switching unit 204 to the ejection tray 210.

Then, the sixth transfer sheet is fed from the paper-feed tray 201 and the image for page 8 is formed on the upper surface of the sixth transfer sheet by the fusing unit 203. The sixth transfer sheet is directed by the transport path switching unit 204 to the duplexing unit DU. The sixth transfer sheet is inverted by the inverter unit 205 and directed by the transport path switching unit 209 to the duplex paper-feed unit 206.

Still referring to FIG. 9A, the third transfer sheet is then transported by the duplex paper-feed rollers 207 to the fusing unit 203, and a blank page is formed on the back surface of the third transfer sheet. The third transfer sheet is thereafter directed by the transport path switching unit 204 to the ejection tray 210. If image formation for page 9 is performed on one side only of the seventh transfer sheet, the seventh transfer sheet would be ejected to the ejection tray 210 before the fourth, the fifth, and the sixth transfer sheets placed in the duplex paper-feed unit 206, thereby changing the order of ejection. Thus, no simplex printing is performed for the seventh transfer sheet at this point.

The fourth transfer sheet is then transported by the duplex paper-feed rollers 207 to the fusing unit 203, and a blank page is formed on the back surface of the fourth transfer sheet. Thereafter, the fourth transfer sheet is directed by the transport path switching unit 204 to the ejection tray 210. Then, the fifth transfer sheet is transported by the duplex paper-feed rollers 207 to the fusing unit 203, where a blank page is formed on the back surface of the fifth transfer sheet. The fifth transfer sheet is then directed by the transport path switching unit 204 to the ejection tray 210.

The sixth transfer sheet is then transported by the duplex paper-feed rollers 207 to the fusing unit 203, and a blank page is formed on the back surface of the sixth transfer sheet. The sixth transfer sheet is thereafter directed by the transport path switching unit 204 to the ejection tray 210. At this point, the switch timing is reached, so that the image forming apparatus switches from duplex printing to simplex printing.

The seventh transfer sheet is then fed from the paper-feed tray 201, and the image for page 9 is fused on the upper surface of the seventh transfer sheet by the fusing unit 203. Thereafter, the seventh transfer sheet is directed by the transport path switching unit 204 to the ejection tray 210. Then the eighth transfer sheet is fed from the paper-feed tray 201 and the image for page 10 is fused on the upper surface of the eighth transfer sheet by the fusing unit 203. The eighth transfer sheet is then directed by the transport path switching unit 204 to the ejection tray 210. The ninth transfer sheet is then fed from the paper-feed tray 201, and the image for page 11 is formed on the upper surface of the ninth transfer sheet by the fusing unit 203. The ninth transfer sheet is then directed by the transport path switching unit 204 to the ejection tray 210. The blank pages involve no image formation on the transfer sheet by the fusing unit 203; during forming of the blank pages, the transfer sheets merely pass through the fusing unit 203 and so no sheet interval is produced.

Output Order by Duplex Designation Count Method

Figure 9B:
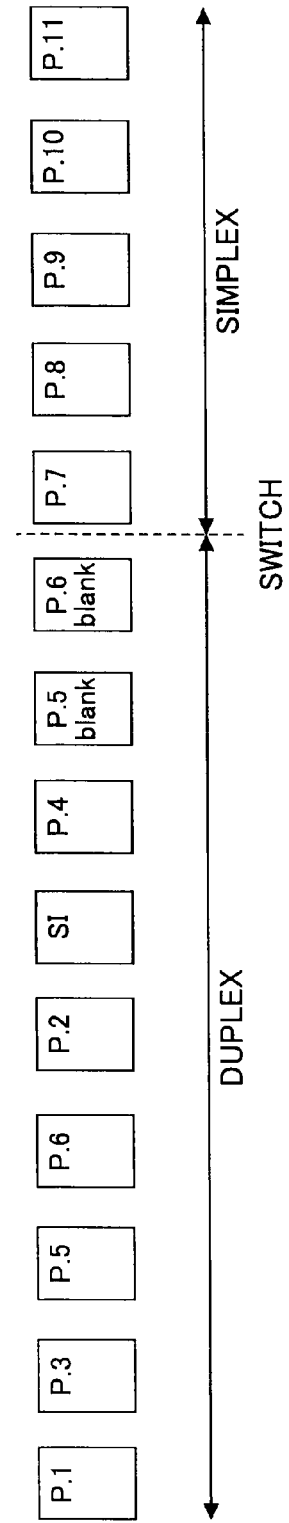

FIG. 9B illustrates an output order for JOB 1 that is determined by the duplex designation count method. As illustrated in FIG. 9B, a switch timing between duplex printing and simplex printing is determined between the fourth transfer sheet and the fifth transfer sheet. Based on the switch timing and the maximum interleave number N, which is four, the first output image is assigned to page 1; the second output image is assigned to page 3; the third output image is assigned to page 5; the fourth output image is assigned to page 6; the fifth output image is assigned to page 2; the sixth output image is assigned to page 4; the seventh output image is assigned to a blank page; the eighth output image is assigned to a blank page; the ninth output image is assigned to page 7; the tenth output image is assigned to page 8; the eleventh output image is assigned to page 9; the twelfth output image is assigned to page 10; and the thirteenth output image is assigned to page 11, as illustrated in FIG. 9B.

The first transfer sheet is fed from the paper-feed tray 201 by the paper-feed rollers 202, and the image for page 1 is fused on the upper surface of the first transfer sheet by the fusing unit 203. Then, the first transfer sheet is directed by the transport path switching unit 204 to the duplexing unit DU. The first transfer sheet transported to the duplexing unit DU is inverted by the inverter unit 205 and then directed by the transport path switching unit 209 to the duplex paper-feed unit 206.

The second transfer sheet is then fed from the paper-feed tray 201, and the image for page 3 is fused by the fusing unit 203 on the upper surface of the second transfer sheet. The second transfer sheet is directed by the transport path switching unit 204 to the duplexing unit DU. The second transfer sheet transported to the duplexing unit DU is inverted by the inverter unit 205 and then directed by the transport path switching unit 209 to the duplex paper-feed unit 206.

The third transfer sheet is fed from the paper-feed tray 201, and the image for page 5 is fused by the fusing unit 203 on the upper surface of the third transfer sheet. The third transfer sheet is then directed by the transport path switching unit 204 to the duplexing unit DU. The third transfer sheet transported to the duplexing unit DU is inverted by the inverter unit 205 and then directed by the transport path switching unit 209 to the duplex paper-feed unit 206.

Still referring to FIG. 9B, the fourth transfer sheet is fed from the paper-feed tray 201, and the image for page 6 is fused by the fusing unit 203 on the upper surface of the fourth transfer sheet. The fourth transfer sheet is then directed by the transport path switching unit 204 to the duplexing unit DU. The fourth transfer sheet transported to the duplexing unit DU is then inverted by the inverter unit 205 and directed by the transport path switching unit 209 to the duplex paper-feed unit 206.

The first transfer sheet is then transported by the duplex paper-feed rollers 207 to the fusing unit 203, where the image for page 2 is fused on the back surface of the first transfer sheet. The first transfer sheet is directed by the transport path switching unit 204 to the ejection tray 210. The second transfer sheet is then transported by the duplex paper-feed rollers 207 to the fusing unit 203, and the image for page 4 is fused on the back surface of the second transfer sheet. The second transfer sheet is then directed by the transport path switching unit 204 to the ejection tray 210. If the image formation for page 7 is performed only on one side of the fifth transfer sheet before the formation of page 4 on the second transfer sheet, the fifth transfer sheet would be ejected to the ejection tray 210 before the second, the third, and the fourth transfer sheets placed on the duplex paper-feed unit 206, thereby changing the order of ejection. Thus, simplex printing for the fifth transfer sheet is not performed at this point. As a result, a one-sheet interval (SI) is produced in the duplex transport path where no printing is performed.

The third transfer sheet is then transported by the duplex paper-feed rollers 207 to the fusing unit 203, where a blank page is formed on the back surface of the third transfer sheet. The third transfer sheet is then directed by the transport path switching unit 204 to the ejection tray 210. Then, the fourth transfer sheet is transported by the duplex paper-feed rollers 207 to the fusing unit 203, and a blank page is fused on the back surface of the fourth transfer sheet. Thereafter, the fourth transfer sheet is directed by the transport path switching unit 204 to the ejection tray 210. At this point, the switch timing is reached, and the image forming apparatus switches from duplex printing to simplex printing.

The fifth transfer sheet is then fed from the paper-feed tray 201, and the image for page 7 is formed on the upper surface of the fifth transfer sheet by the fusing unit 203. Thereafter, the fifth transfer sheet is directed by the transport path switching unit 204 to the ejection tray 210. The sixth transfer sheet is then fed from the paper-feed tray 201, and the image for page 8 is formed on the upper surface of the sixth transfer sheet by the fusing unit 203. The sixth transfer sheet is directed by the transport path switching unit 204 to the ejection tray 210. The seventh transfer sheet is then fed from the paper-feed tray 201, and the image for page 9 is formed on the upper surface of the seventh transfer sheet by the fusing unit 203. The seventh transfer sheet is then directed by the transport path switching unit 204 to the ejection tray 210.

Still referring to FIG. 9B, the eighth transfer sheet is then fed from the paper-feed tray 201, and the image for page 10 is formed by the fusing unit 203 on the upper surface of the eighth transfer sheet. The eighth transfer sheet is directed by the transport path switching unit 204 to the ejection tray 210. The ninth transfer sheet is fed from the paper-feed tray 201, and the image for page 11 is formed on the upper surface of the ninth transfer sheet by the fusing unit 203, and the ninth transfer sheet is then directed by the transport path switching unit 204 to the ejection tray 210. The blank pages involve no image formation on the transfer sheet by the fusing unit 203; the blank pages merely pass through the fusing unit 203, so that no sheet interval is produced.

Thus, because the transfer sheet for simplex printing cannot be printed by passing through the duplexing unit DU, a blank page is apparently inserted on the back surface of the transfer sheet for simplex printing, so that the transfer sheet can pass through the duplexing unit DU and no sheet interval is produced, thus enhancing productivity. Thus, in accordance with the compulsory duplexing method according to the present embodiment, a blank page is inserted in order to change the print order at the time of image output to the image forming unit, thereby preventing the development of a sheet interval and preventing the delay in outputting print data including both duplex printing and simplex printing images.

Figure 10:
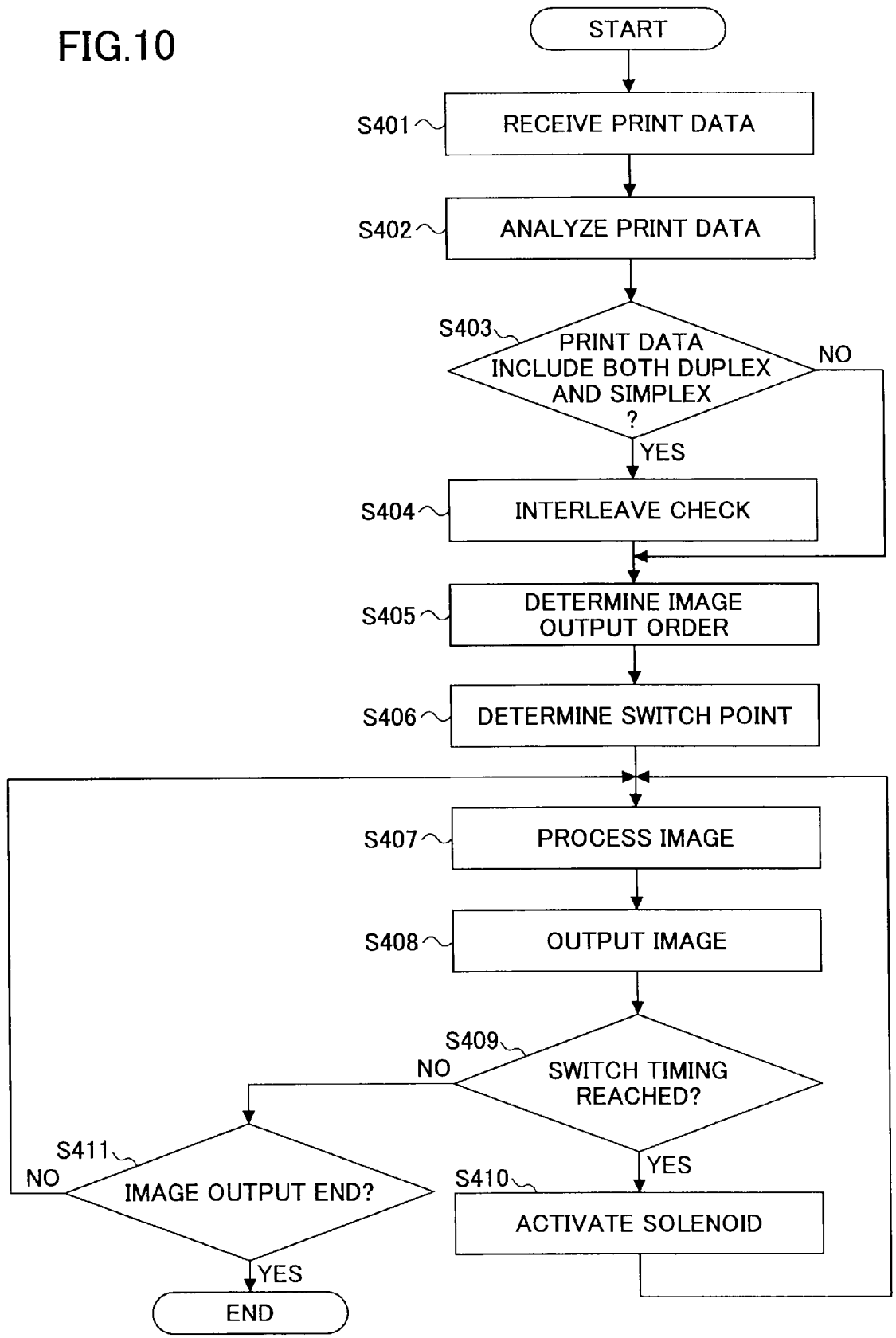
FIG. 10 depicts a flowchart of a data printing process according to an embodiment of the present invention.

FIG. 10 depicts a flowchart of print data processing that is performed by the image forming apparatus. The print data is directly transmitted from the host apparatus (PC) 20 to the image forming apparatus 30 or 40, without going through a printer driver. The transmitted print data is received via the communication I/F 5 of the image forming apparatus 30 or 40 by the print data reception unit 301 (step S401).

The print data received by the print data reception unit 301 is then analyzed by the print data analyzing unit 302 to determine whether duplex printing and simplex printing images are present within single print job data, requiring switching from duplex printing to simplex printing. It is also determined whether each image in the print data is designated for duplex printing or simplex printing, and the print direction of each image is identified (step S402).

If the print data involves both duplex printing and simplex printing (YES in step S403), an interleave check is conducted (step S404). Variables used for the interleave check include an interleave count (a variable indicating how many leaves, or transfer sheets, have been placed on the transport path), and the maximum interleave number N (which varies depending on the apparatus). The interleave count value is initialized because there is no transfer sheet on the duplex transport path. If the interleave check indicates that a setting is made by the application that enables duplex printing, it is then determined if compulsory duplex printing can be performed for the maximum interleave number N of transfer sheets, i.e., four transfer sheets. The details of the interleave check are described later.

The compulsory duplex printing involves inserting a blank page on the back surface of an image designated for simplex printing, so that the image data designated for simplex printing is handled as image data for duplex printing, thus allowing the transfer sheet to pass through the duplexing unit DU and filling the transport path with transfer sheets. Thereafter, an image output order is determined by the image output order determination unit 304 (step S405).

If in step S403, the print data does not include both duplex printing and simplex printing data (NO in step S403), the routine proceeds to step S405 where the image output order determination unit 304 is instructed to perform either duplex printing or simplex printing.

In step S406, the switch timing at which the separating gate is switched from duplex printing to simplex printing is determined (step S406). The image output unit 306 then rasterizes the print data (step S407), and outputs the rasterized image to the printer engine 13 in the image output order determined by the image output determination unit 304 (step S408).

If the switch timing for the separating gate determined in step S406 is reached while the image output unit 306 is outputting an image to the printer engine 13 (YES in step S409), the solenoid 16 is activated to switch the separating gate in order to switch from the transport path for duplex printing to the transport path for simplex printing (step S410). The routine then returns to step S407. If the image output ends (YES in step S411) before the switch timing for the separating gate is reached (NO in step S409), the procedure ends.

Figure 11A:
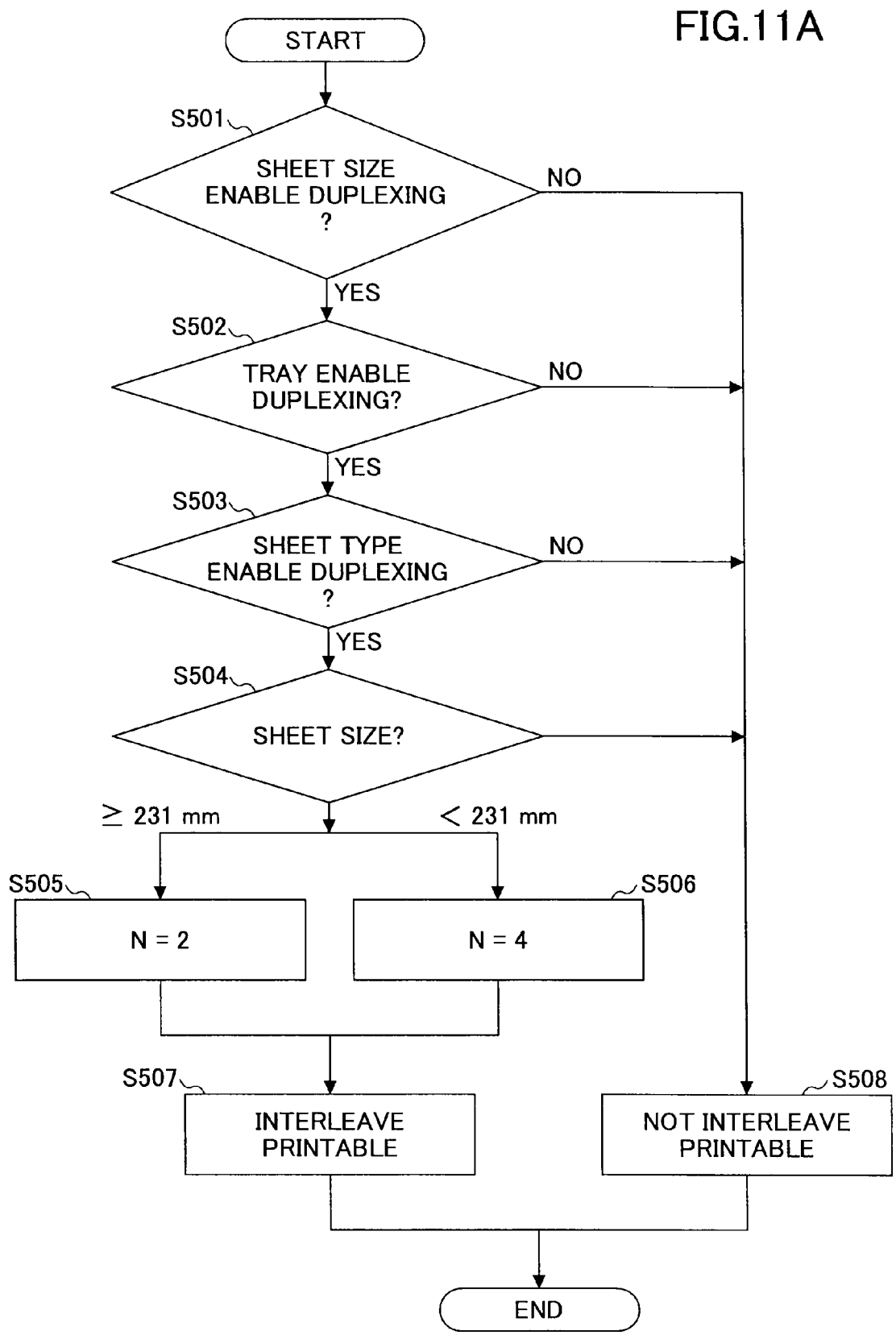
FIG. 11A depicts a flowchart illustrating an interleave check process.

FIG. 11A is a flowchart illustrating the interleave check process in detail. The interleave check determines whether a duplex-printing-enabling setting is in place, and determines the maximum interleave number N. Specifically, it is sequentially determined whether the size of the sheet enables duplex printing (step S501); whether the paper-feed tray 201 enables duplex printing (i.e., whether transfer sheets are set on the paper-feed tray 201) (step S502); and what the type of the sheet is, such as whether it is recycled paper or colored paper (step S503).

FIG. 11B shows a table of various types of transfer sheet that either enable or do not enable duplex printing for a certain type of an image forming apparatus. FIG. 11C shows a table of different interleave numbers N for various sizes of transfer sheet.

The paper-feed tray 201 may not be duplexing enabling when a duplex printing preventing setting is made by a user in the image forming apparatus. A duplex printing preventing setting is made when, for example, a transfer sheet with an image already formed on its upper surface is placed in the tray and the user does not want any additional image formed on the upper surface of the transfer sheet.

The maximum interleave number N is determined by the length of the transport path in the image forming apparatus and the size of the transfer sheet that is transported (step S504). In view of the letter size being 215.9 mm×279.4 mm, reference is made to a transfer sheet length of 231 mm in the direction of transport. For example, when the transfer sheet length is 231 mm or more and 458 mm or less, double-sheet interleave (N=2) is selected (step S505). When the transfer sheet length is 148 mm or more and less than 231 mm, four-sheet interleave (N=4) is selected (step S506). Once either double-sheet interleave or four-sheet interleave is determined, it is determined that interleave printing is enabled (S505).

If either the transfer sheet size is not duplexing enabling (NO in step S501), the paper-feed tray 201 is not duplexing enabling (NO in step S502), or the sheet type is not duplexing enabling (NO in step S503), it is determined that interleave printing is not enabled (step S508). Thus, the maximum interleave number N is determined through the interleave check by determining whether a duplexing enabling setting is made by the application.

With reference to FIGS. 12 and 13, the duplex/simplex switch count method and the duplex designation count method are compared. As illustrated in FIGS. 12 and 13, the duplex designation count method eliminates the need to insert a blank page on the back surface of a transfer sheet printed with an image for which simplex printing is designated, thereby enhancing productivity.

Figure 12B:
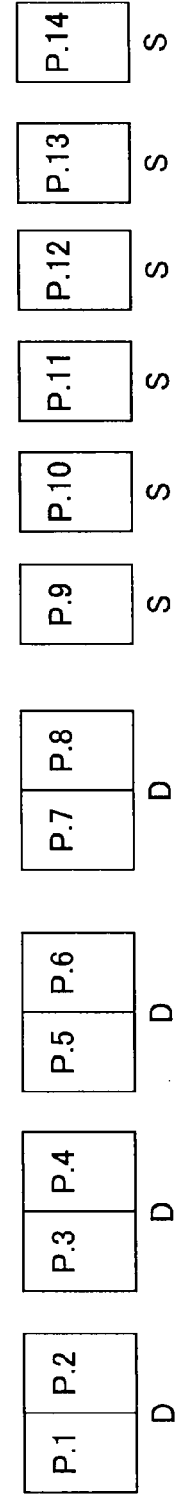

FIG. 12A shows settings designated by the host apparatus (PC) 20 for JOB 2, designating an A4-sized Long-Edge-Feed transfer sheet, duplex printing for pages 1 through 8, and simplex printing for pages 9 through 14. FIG. 12B shows an intended result of printing JOB 2 in accordance with the settings of FIG. 12A.

Figure 12C:
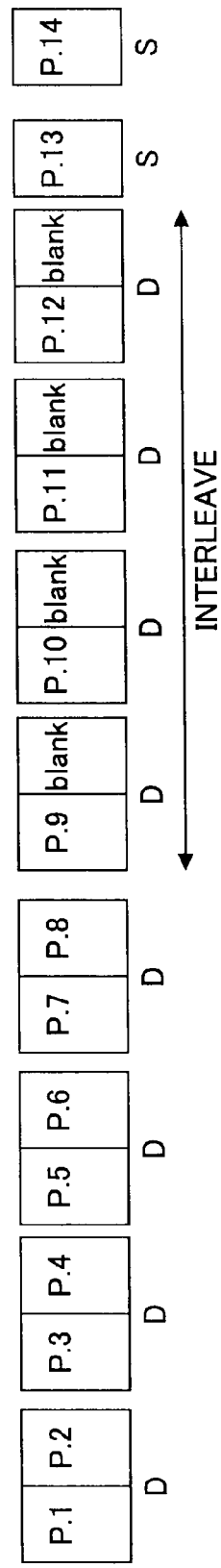
Figure 13A:
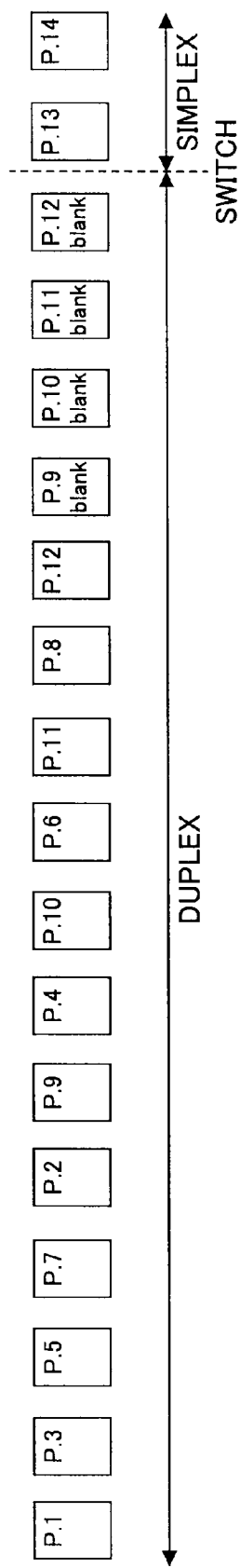
FIGS. 13A and 13B depict image output results obtained by the different ways of determining an image output order shown in FIGS. 9C and 9D.

With reference to FIG. 12C, the switch point from duplex printing to simplex printing is determined to be at the end of page 8. An image output order is then determined, so that, at the time of image output, blank pages from the back surface of page 9 to the back surface for page 12 are successively transported, as shown in FIG. 13A. Because each blank page is merely transported and involves no image formation, no sheet interval is produced.

Thus, by inserting a blank page on the back surface of a transfer sheet for an image for which simplex printing is designated, the print order is changed upon image output so that the development of a sheet interval is prevented. Thus, the delay in the output of print data that includes both images for which duplex printing is designated and images for which simplex printing is designated can be prevented.

Figure 12D:
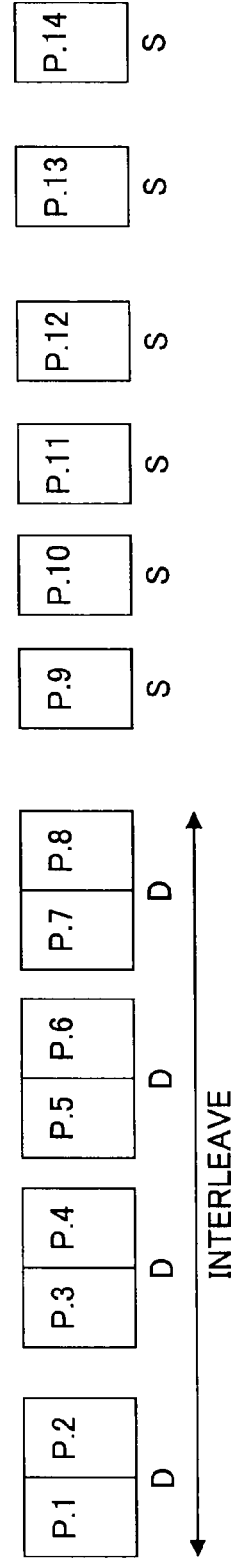
Figure 13B:
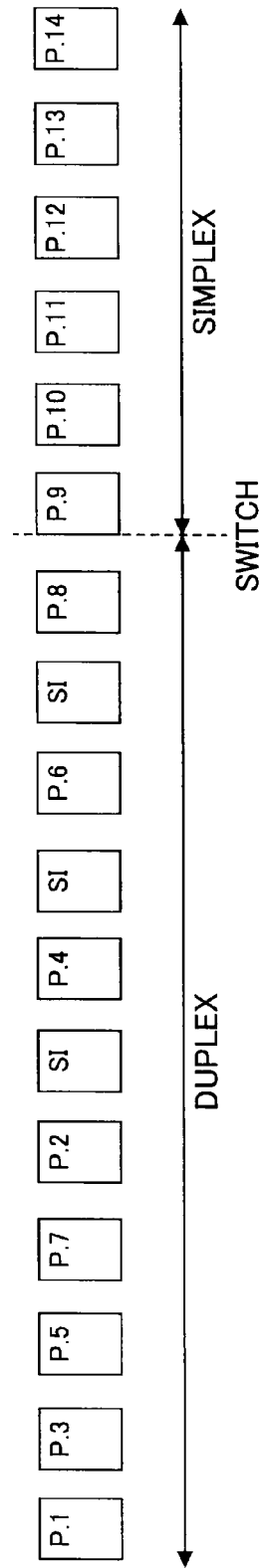

FIG. 12D illustrates an image output order determined by the duplexing designation count method. When the duplex designation count method is applied to JOB 2, the print order is determined in the same way as in the case of FIG. 11D. Although sheet intervals are caused between pages 2 and 4, pages 4 and 6, and pages 6 and 8, as shown in FIG. 13B, no blank page needs to be inserted. Thus, the number of pages that pass through the duplex transport path can be reduced by five pages compared to the duplex/simplex switch count method. Furthermore, for page 9 and the subsequent pages, duplex printing is switched to simplex printing with the shorter transport path, thus further enhancing productivity.

Thus, the duplex designation count method eliminates the need to insert a blank page on the back surface of a transfer sheet for an image for which simplex printing is designated, thus enhancing productivity.

Although this invention has been described in detail with reference to certain embodiments, variations and modifications exist within the scope and spirit of the invention as described and defined in the following claims.

For example, while in the foregoing embodiments the print data that includes both images for duplex printing and images for simplex printing has been described as being generated by a special application, such print data may be generated by programming by a user or by a printer driver.

In the foregoing embodiments, when the print data includes both an image for which duplex printing is designated and an image for which simplex printing is designated, a blank page is inserted on the back surface of an image for which simplex printing is designated. In another embodiment, instead of inserting a blank page, the image designated for simplex printing may be caused to simply pass through the fusing unit 203 without any insertion of a blank page (such as by a simple feeding of a transfer sheet in the case of an inkjet system).

The processes described in the flowcharts of the drawings may be written as a program that can be executed by the CPU 9. Such a program may be recorded in a computer-readable recording medium, such as a semiconductor memory or an optical and/or magnetic memory. The program in such a recording medium may be read by a system according to an embodiment of the present invention and executed by a CPU to provide substantially the same advantageous effects as those provided by the foregoing embodiments of the present invention.

The present application is based on the Japanese Priority Application No. 2008-281874 filed Oct. 31, 2008, the entire contents of which are hereby incorporated by reference.

What is claimed is:

1. An image forming apparatus comprising:
an image forming unit including a transport path for transporting a transfer sheet and configured to form a print image on the transfer sheet based on print image data;
an interleave unit configured to perform duplex printing by controlling an order of output of the print image data to the image forming unit;
a receiving unit configured to receive a print request for the print image data;
an analyzing unit configured to determine whether the print request received by the receiving unit includes a duplex printing instruction and a simplex printing instruction;
a determination unit configured to determine a maximum number of the transfer sheets that can be placed on the transport path;
an output order determination unit configured to determine the order of output of the print image data based on the maximum number of the transfer sheets determined by the determination unit;
a switch timing determination unit configured to determine a switch timing for switching from duplex printing to simplex printing when the analyzing unit determines that the print request received by the receiving unit includes a duplex printing instruction and a simplex printing instruction;

a blank sheet image inserting unit configured to insert a blank sheet image at the switch timing in the order of output of the print image data determined by the output order determination unit;

an output unit configured to output the print image or the blank sheet image to the image forming unit in accordance with the output order determined by the output order determination unit; and a print switch control unit configured to control switching between duplex printing and simplex printing in accordance with the switch timing determined by the switch timing determination unit;

wherein the blank sheet image is formed on a back surface of a transfer sheet for simplex printing while duplex printing is being performed, and wherein the blank sheet image inserting unit is configured to control the number of the blank sheet images inserted at the switch timing in the output order based on the maximum number of transfer sheets determined by the determination unit.

2. The image forming apparatus according to claim 1, wherein the blank sheet image inserting unit is configured to control the number of the blank sheet images inserted at the switch timing in the output order further based on the number of transfer sheets for duplex printing.

3. The image forming apparatus according to claim 1, wherein the determination unit is configured to determine the maximum number of transfer sheets that can be placed on the transport path depending on a size of the duplex transport path of the image forming apparatus and a size of the transfer sheet.

4. An image forming method for printing print image data using an image forming apparatus having an interleave function for performing duplex printing by controlling an order of output of the print image data to an image forming unit of the image forming apparatus, the image forming method comprising:

determining whether the print image data includes both a duplex printing instruction and a simplex printing instruction;

determining a maximum number of transfer sheets that can be placed on a transport path in the image forming apparatus;

determining a switch timing between duplex printing and simplex printing when it is determined that the print image data includes both a duplex printing instruction and a simplex printing instruction;

determining the order of output of the print image data to the image forming unit of the image forming apparatus, based on the determined maximum number of transfer sheets and the determined switch timing;

outputting a print image or a blank sheet image to the image forming unit in the determined output order; and controlling switching between the duplex printing and the simplex printing based on the determined switch timing and forming the print image on one of the transfer sheets based on the print image data or forming the blank sheet image on one of the transfer sheets, wherein:

the blank sheet image is formed on a back surface of a transfer sheet for simplex printing while duplex printing is being performed, and the number of the blank sheet images inserted at the switch timing in the output order of the print image data based on the maximum number of transfer sheets which has been determined.

5. A non-transitory computer-readable recording medium storing an image formation control program for controlling printing of print image data using an image forming apparatus having an interleave function for performing duplex printing by controlling an order of output of the print image data to an image forming unit of the image forming apparatus, which image formation control program, when executed by one or more processors of an information processing apparatus, carries out:

determining whether the print image data includes both a duplex printing instruction and a simplex printing instruction;

determining a maximum number of transfer sheets that can be placed on a transport path in the image forming apparatus;

determining a switch timing between duplex printing and simplex printing when it is determined that the print image data includes both a duplex printing instruction and a simplex printing instruction;

determining the order of output of the print image data to the image forming unit of the image forming apparatus, based on the determined maximum number of transfer sheets and the determined switch timing;

outputting a print image or a blank sheet image to the image forming unit in the determined output order; and controlling switching between the duplex printing and the simplex printing based on the determined switch timing and forming the print image on one of the transfer sheets based on the print image data or forming the blank sheet image on one of the transfer sheets, wherein:

the blank sheet image is formed on a back surface of a transfer sheet for simplex printing while duplex printing is being performed, and the number of the blank sheet images inserted at the switch timing in the output order of the print image data based on the maximum number of transfer sheets which has been determined.

* * * * *